Jan. 13, 1970   J. M. Y. LE CLERC DE BUSSY   3,489,545
DEVICE FOR PRODUCING SMALL OBJECTS FROM
A CONTINUOUS STREAM OF GLASS
Filed June 21. 1968
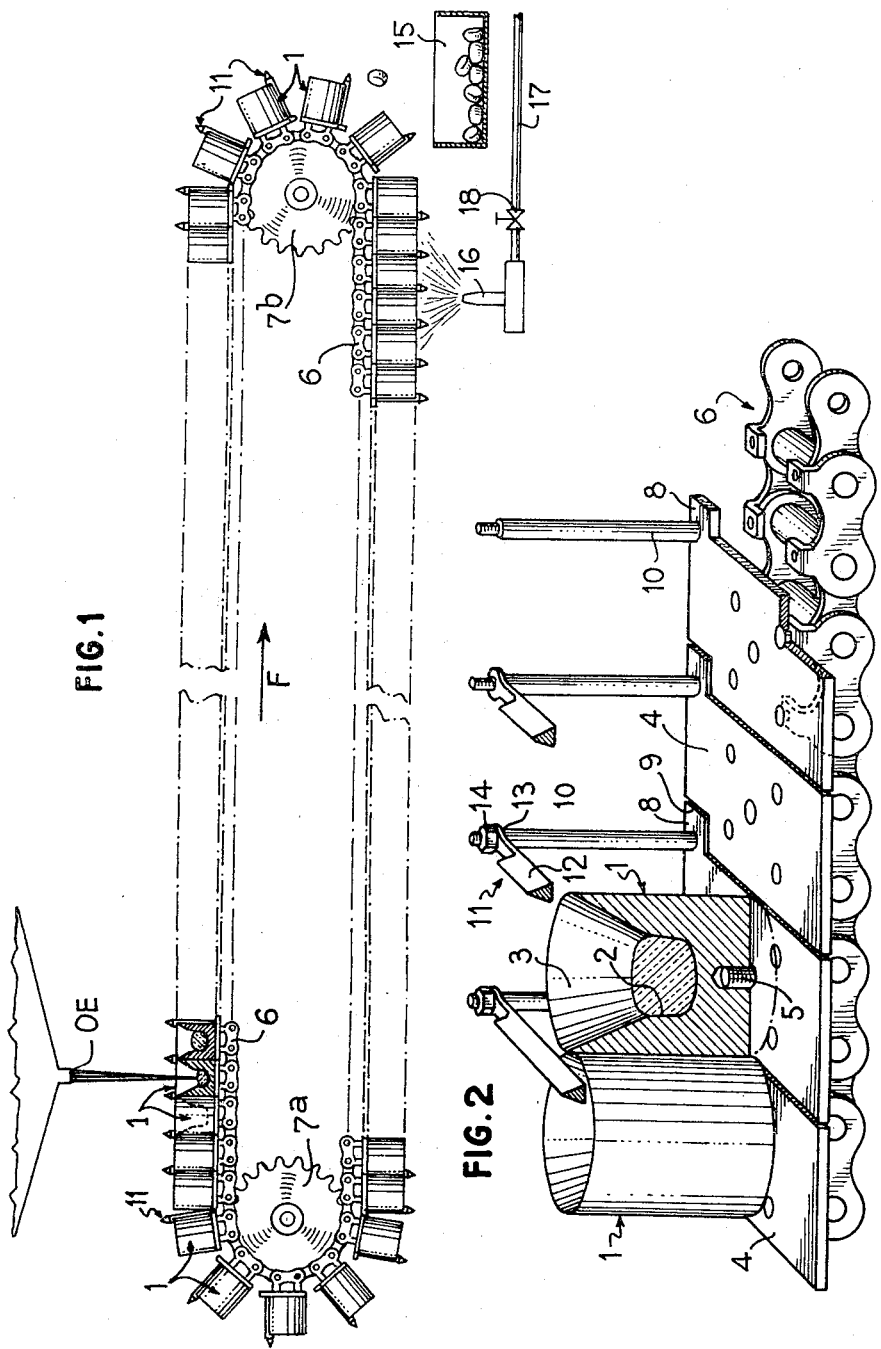
JACQUES MARIE YVES LE CLERC DE BUSSY,
INVENTOR

United States Patent Office 3,489,545
Patented Jan. 13, 1970

3,489,545
DEVICE FOR PRODUCING SMALL OBJECTS FROM A CONTINUOUS STREAM OF GLASS
Jacques Marie Yves le Clerc de Bussy, Aumatre par Oisemont, France, assignor to Verreries Pochet et du Courval, Paris, France
Filed June 21, 1968, Ser. No. 738,944
Claims priority, application France, July 7, 1967, 113,528
Int. Cl. C03b 19/10
U.S. Cl. 65—184                                       6 Claims

ABSTRACT OF THE DISCLOSURE

Device for producing in moulds on an endless conveyor small objects from a continuous stream of low-viscosity glass. The stream of glass is separated by stream-separating bars coinciding with the line of intersection of a plane located slightly above the plane of the openings of the moulds and a plane of separation between two adjacent moulds. The bar has a triangular cross-sectional shape and is brought in vertical alignment with the glass pouring orifice for this purpose.

---

The present invention relates to the production of small objects of glass from a continuous jet or stream of glass. In this production method, small amounts of glass must be periodically separated from the stream of glass in the molten state, these small amounts each becoming the desired object. These objects are produced for example in moulds and can be in varied forms.

The small amounts of glass are usually separated by a mechanical severing of the continuous stream, whose temperature is previously adjusted so that it has a fluid viscosity. The mechanical severing requires a relatively complicated apparatus which easily deteriorates.

The object of the invention is to eliminate this severing operation.

The invention provides a device for producing small objects from a continuous stream of low-viscosity glass, said device comprising an endless conveyor on which is mounted a series of moulds which, owing to the motion of the conveyor, are brought in succession into vertical alignment with the glass pouring aperture, a series of glass stream-separating bars extending transversely relative to the direction of motion of said conveyor, the axis of each of said bars coinciding, in the filling positon of said moulds, with the line of intersection of a plane located slightly above the plane of the openings of said moulds and a plane of separation of two consecutive moulds.

According to another feature of the invention, said separating bars have a triangular cross-sectional shape and their apex is located in the respective plane of separation of two moulds.

Preferably, said apices are rounded.

Further features and advantages of the invention will be apparent from the ensuing description with reference to the accompanying drawing.

In the drawing:

FIG. 1 is a diagrammatic elevational view of a device for producing small objects of glass according to the invention, and FIG. 2 is a perspective view, on an enlarged scale, of a detail of said device.

In the embodiment shown in the drawing, the device according to the invention is adapted to produce glass slugs or pellets. For this purpose, moulds or troughs are provided each of which comprises a cylindrical cavity 2 which is outwardly divergent so as to form a conical entrance 3 (FIGS. 1 and 2).

Each of the moulds 1 is secured to a plate 4 by means of a screwthreaded stud 5. The plates are respectively integral with links of an endless conveyor chain 6 which engages two sprocket wheels 7ª and 7ᵇ one of which is driven at a continuous speed by a motor (not shown). The shafts of the sprocket wheels are supported by a stand (not shown). The upper reach of the endless conveyor therefore moves in the direction of arrow F.

A glass pouring or flow orifice OE is located in the vicinity of the wheel 7ª, that is, at the upstream end of the upper reach of the conveyor, the axis of this orifice coinciding with the axis of each trough as the latter passes under the orifice.

Each of the plates 4 is provided with a projecting portion 8 which extends into a notch 9 in the adjacent plate 4.

A rod 10, screwthreaded at its upper end, is mounted on each projecting portion 8. A separating bar 11, for example of steel or graphite, and comprising a reinforced portion having a triangular cross-sectional shape 12 and a flat-shaped portion terminating in an eye 13, is secured to each of the rods by means of a nut 14. The separating bars are thus respectively located in the planes separating the moulds. The rods 10 have such length that the axes of the bars are located in a plane located slightly above the plane of the openings 3 of the moulds when the latter are filled with glass. The apex angle of the triangular cross-sectional shape of the bars is preferably 30° and this apex is advantageously rounded or radiused and polished.

A container 15 is placed under the downstream end of the upper reach of the chain 6 for receiving the cooled glass pellets dropping from the moulds when the latter are inserted as they travel from the upper to the lower reach of the chain.

A cooling device 16 is located near this downstream end (that is, near the upstream end of the lower reach of the chain 6), this device comprising a spray nozzle which is fed with water by way of a conduit 17 and a valve 18. The nozzle is directed towards the openings of the moulds. The spray water can contain a soluble lubricant so as to slightly lubricate the moulds 1 and separating bars 11.

This cooling device maintains the bars and moulds at low temperature, for example of the order of 80° C., so that these bars and moulds cannot be wet by the molten glass, on the contrary, owing to this low temperature and to the property of glass at high temperature, the glass draws together and results in a curved surface similar to that of mercury at rest in a container of the same shape. This same property of glass at high temperature results in the separation of the stream of glass on the separating bars 11.

The stream of glass flowing from the orifice OE enters the moulds where it fills the cavity 2. However, as the moulds move at constant speed, the glass, after having filled the cavity 2 of one mould 1, runs along the upstream portion of the conical wall of the entrance of the mould and the downstream inclined face of the following separating bar 11. When the edge or apex of the latter is in vertical alignment with the axis of the pouring orifice OE, the stream is separated into two parts in running along also the upstream inclined face of the bar and, an instant later, also the portion of the downstream face of the following mould which consequently starts to be filled. Meanwhile, owing to the effect of the edge of the bar 11, no more material is received on the downstream side of the bar.

It will be understood that it is very important that the travelling speed of the moulds be constant and of exactly determined value. Moreover, for each desired weight of the glass pellet obtained, there corresponds a particular travelling speed which can be selected by trial and error.

It will be observed that the bases of the bars 12 overlie the adjacent ridges of the corresponding moulds.

The small amounts of glass in the moulds cool down as they are conveyed to the downstream end of the upper reach of the conveyor chain. When inverting the moulds, the cooled and set pellets are stripped from the moulds and drop into the container 15. These pellets can be employed for various purposes, for example for producing glass fibres.

After inversion, the moulds are cooled by the spray water containing the lubricant issuing from the nozzle 16.

The amounts of glass formed can be stripped from the moulds before or after the glass has set, depending on the contemplated subsequent use. For example, objects of complicated shape can be produced by moulding pellets of glass in the device described hereinbefore in moulds of suitable configuration, stripping these pellets of glass while they are still plastic and thereafter introducing them into press-actuated conventional moulds so as to impart thereto the final shape.

In selecting a short length of endless chain, amounts of glass in the molten state can be obtained which can be very easily distributed by way of channels, of for example graphite, of various lengths leading to the melting units of machines employing these amounts for a subsequent treatment.

The continuous flow of glass occurs at very low viscosity, that is, at a temperature usually exceeding 1400° C., and preferably between 1500° and 1600° C. For this purpose, electric glass-making furnaces, for example those described in U.S. patent application No. 624,252, filed on Mar. 3, 1967, and U.S. Patents Nos. 3,147,328 and 3,376,373, can be employed.

By way of an example by which the invention is not intended to be limited, each reach of the chain can have a length of 10 metres and travel at a speed of 14 metres per minute. In this way, it is possible to treat 250 kg. of glass per hour for a given weight of the pellets obtained.

Having now described my invention, what I claim as new and desire to secure by Letters Patent is:

1. A device for producing small objects for use with means for issuing a relatively narrow, continuous stream of low viscosity glass from a pouring orifice, said device comprising generally horizontal conveying means disposed under said pouring orifice, a series of moulds and means to rigidly mount them with said conveying means so as to be brought in succession into vertical alignment with said pouring orifice, each mould having a rim defining the edge of an upwardly open cavity, said rim having portions which are contiguous respectively with corresponding rim portions of adjacent moulds, and a series of glass stream-separating bars with means to rigidly connect them and above said conveying means and extending transversely relative to the direction of motion of the latter, each of said bars including means supporting same slightly above contiguous rim portions of two adjacent moulds, in the filling position of said moulds, and each of said bars having upwardly converging side portions terminating in an upper apex edge which apex is contained substantially in a vertical plane of separations between a pair of corresponding adjacently contiguous moulds.

2. A device as defined in claim 1 wherein each of said bars is of triangular cross section.

3. A device as defined in claim 1 wherein said apex edge is rounded.

4. A device as defined in claim 1 wherein said conveying means is an endless belt which has an upper reach and a lower reach travelling in the opposite direction to said upper reach, said glass pouring orifice being disposed above the upstream end of said upper reach of said endless belt, the device further comprising a container disposed below the downstream end of said upper reach so as to receive the objects formed in the moulds as they are discharged when inverted in travelling from said upper reach to said lower reach.

5. A device as defined in claim 1 comprising a cooling device for the moulds, said cooling device being disposed at the downstream end of said endless belt below said lower reach.

6. A device as defined in claim 5 wherein said cooling device comprises spray means directed toward said bars and moulds, and means for feeding water preferably containing a lubricant to and connected with said spray means.

References Cited

UNITED STATES PATENTS

| 1,125,895 | 1/1915 | Bingham | 65—334 XR |
| 1,249,401 | 12/1917 | Hopkinson | 65—334 XR |
| 1,317,176 | 9/1919 | Potter | 65—334 XR |
| 2,271,004 | 1/1942 | Gray | 65—334 XR |
| 3,352,658 | 11/1967 | Knapp | 65—334 XR |

FRANK W. MIGA, Primary Examiner

U.S. Cl. X.R.
65—133, 334